(12) United States Patent
Scheid et al.

(10) Patent No.: US 9,669,539 B2
(45) Date of Patent: Jun. 6, 2017

(54) MAGNETIC DRILL SYSTEM

(71) Applicant: The United States of America as represented by the Secretary of the Navy, Washington, DC (US)

(72) Inventors: Eric Scheid, Bloomington, IN (US); Brad Moan, Greenwood, IN (US); Travis Bohnert, Raeford, NC (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 183 days.

(21) Appl. No.: 14/666,269

(22) Filed: Mar. 23, 2015

(65) Prior Publication Data

US 2015/0266105 A1     Sep. 24, 2015

Related U.S. Application Data

(60) Provisional application No. 61/968,662, filed on Mar. 21, 2014.

(51) Int. Cl.
*B23B 45/14*     (2006.01)
*B25H 1/00*     (2006.01)
(Continued)

(52) U.S. Cl.
CPC ........... *B25H 1/0071* (2013.01); *B23B 45/02* (2013.01); *B23B 2250/12* (2013.01);
(Continued)

(58) Field of Classification Search
CPC ..... B23B 47/26; B23B 39/006; B23B 49/026; B23Q 17/22; B23Q 17/2233;
(Continued)

(56) References Cited

U.S. PATENT DOCUMENTS 2,475,342 A     7/1949 Vines et al.
4,261,673 A     4/1981 Hougen
(Continued)

FOREIGN PATENT DOCUMENTS

| CN | 201214235 | 4/2009 | |
|---|---|---|---|
| CN | 201644860 | 11/2010 | |
| GB | 2060442 A | * 5/1981 | ......... B23Q 11/1084 |

OTHER PUBLICATIONS

BDS Maschinen GmbH, AutoMAB 1500—Drilling with automatic feed, 2013, retrieved from http://bds-maschinen.kernbohrer.de/produkte/automab1500.html.

(Continued)

*Primary Examiner* — Sunil K Singh
*Assistant Examiner* — Nicole N Ramos
(74) *Attorney, Agent, or Firm* — Christopher A. Monsey

(57) ABSTRACT

An auto-feeding permanent magnet drill comprising a first permanent magnet capable of being removeably coupled to a magnetic material. A coupler plate couples to the first permanent magnet. A drill frame couples to the coupler plate, the coupler plate providing an interface to couple the first permanent magnet to the frame. User interfaces are provided to enable control for powering the drill, enabling a drill or cutter bit auto-feed feature, enabling a lubrication system and enabling a mechanical adjustment system. An electric drill is coupled to the frame, the electric drill coupled to the auto-feed feature and electronically coupled to the user interfaces. A lubrication reservoir couples to a second permanent magnet capable of coupling the lubrication reservoir to a magnetic material or work surface. A flexible distribution tube delivers lubricant from the lubrication reservoir to a nozzle, the nozzle oriented towards the cutting surface and capable of distributing lubricating fluid (Continued)

to the cutting surface or rotating drill bit components during a drilling operation.

34 Claims, 8 Drawing Sheets

(51) Int. Cl.
 *B23B 45/02* (2006.01)
 *B23Q 11/10* (2006.01)
 *B23Q 9/00* (2006.01)
(52) U.S. Cl.
 CPC ... *B23B 2260/122* (2013.01); *B23B 2260/128* (2013.01); *B23B 2270/32* (2013.01); *B23B 2270/483* (2013.01); *B23Q 9/00* (2013.01); *B23Q 11/10* (2013.01); *B23Q 11/1092* (2013.01); *Y10T 408/03* (2015.01); *Y10T 408/16* (2015.01); *Y10T 408/172* (2015.01); *Y10T 408/44* (2015.01); *Y10T 408/46* (2015.01); *Y10T 408/554* (2015.01)
(58) Field of Classification Search
 CPC ............ B23Q 17/2275; B23Q 17/2414; B23Q 17/2419; B23Q 17/2404; B25H 1/0071; B25H 1/0064; B25H 1/0057; B25H 1/0021
 USPC .................... 408/5–12, 13, 16, 76, 132, 136
 See application file for complete search history.

(56) References Cited

U.S. PATENT DOCUMENTS

| | | | |
|---|---|---|---|
| 4,591,301 A * | 5/1986 | Pelfrey | B25H 1/0071 408/135 |
| 4,604,006 A | 8/1986 | Shoji et al. | |
| 4,687,385 A | 8/1987 | Palm et al. | |
| 4,780,654 A | 10/1988 | Shoji et al. | |
| 5,035,547 A | 7/1991 | Shoji et al. | |
| 5,129,868 A | 7/1992 | Sudo et al. | |
| 5,275,514 A * | 1/1994 | Johnson | B23Q 3/1546 408/710 |
| 5,342,153 A * | 8/1994 | Dobkins | B25H 1/0064 408/1 R |
| 5,346,453 A | 9/1994 | Rivera-Bottzeck et al. | |
| 5,444,634 A * | 8/1995 | Goldman | G05B 19/182 184/6.1 |
| 5,902,076 A | 5/1999 | Miller et al. | |
| 6,905,291 B2 * | 6/2005 | Day | B21J 15/14 408/103 |
| 7,108,459 B1 | 9/2006 | Mueller | |
| 7,494,306 B2 * | 2/2009 | Sihmada | B23Q 1/4876 184/6.14 |
| 7,936,142 B2 | 5/2011 | Otsuka et al. | |
| 8,376,667 B2 | 2/2013 | Wilbert et al. | |
| 8,784,015 B2 | 7/2014 | Elsmark et al. | |
| 9,227,285 B1 * | 1/2016 | Briggs | B23Q 9/00 |
| 2010/0028093 A1 * | 2/2010 | Otsuka | B23Q 5/22 408/10 |
| 2010/0071192 A1 * | 3/2010 | Sarh | B21J 15/14 29/525.06 |
| 2013/0089382 A1 * | 4/2013 | Baditoi | B23Q 11/10 408/56 |
| 2013/0108385 A1 * | 5/2013 | Woelders | B23B 45/00 408/6 |
| 2014/0314507 A1 | 10/2014 | Timmons et al. | |

OTHER PUBLICATIONS

BDS Maschinen GmbH, AutoMAB 1500—Drilling with automatic feed, 2013, retrieved from http://bds-maschinen.kernbohrer.de/produkte/img/automab1500/automab1500-techzeichnung.jpg.
BDS Maschinen GmbH, AutoMAB 1500—Drilling with automatic feed, 2013, retrieved from http://www.kernbohrer.de/downloads/bedienungsanleitungen/automab1500.pdf.

* cited by examiner

MAGNETIC DRILL SYSTEM

CROSS-REFERENCE TO RELATED APPLICATION

This application claims priority to U.S. Provisional Application Ser. No. 61/968,662 filed on Mar. 21, 2014 the disclosure of which is expressly incorporated herein by reference.

STATEMENT REGARDING FEDERALLY SPONSORED RESEARCH OR DEVELOPMENT

The invention described herein includes contributions by one or more employees of the Department of the Navy made in performance of official duties and may be manufactured, used and licensed by or for the United States Government for any governmental purpose without payment of any royalties thereon. This invention (Navy Case 103,113) is assigned to the United States Government and is available for licensing for commercial purposes. Licensing and technical inquiries may be directed to the Technology Transfer Office, Naval Surface Warfare Center Crane, email: Cran_CTO@navy.mil.

FIELD OF THE DISCLOSURE

The present disclosure generally relates to an apparatus and method for an magnetic drill system and more particularly to an improved magnetic drill system having a non-stationary lubrication system and a permanent magnetic base.

BACKGROUND AND SUMMARY OF THE INVENTION

The present invention relates to magnetic drills or mag drills. Mag drills are portable drills designed to cut metal. One type of mag drill can include an alternating current (AC) electrically powered mag drill with the AC power driving both the drill and the electromagnetic base. When power is supplied and the drill is activated, the electromagnetic base causes the drill to be magnetically affixed to, for example, a metal work surface. The attractive electromagnet force is strong enough to both support the drill being affixed to the work surface as well as oppose any drilling forces occurring as a result of the drill bit engaging the work surface. Two versions of an AC mag drill may include systems with an auto-feeding feature and a direct current (DC) powered drill with a permanent magnetic base. The auto-feeding feature may provide various benefits for a user. For example, because drill speed and technique are critical to the performance of a mag drill if the drill is fed using the auto-feeding feature user error is less likely. Also, a user does not have to handle the drill, which increases safety and productivity.

DC powered mag drills remove the need for wired or generated power however one of the shortcomings of the DC powered mag drill is that the reduced power available from the batteries precludes successful use of electromagnets. For mobile and safe operation, current electromagnetic options are not viable. In the mobile environment, reliable AC power cannot be guaranteed. With regard to AC powered mag drills having an electromagnetic base, interruption of power or having an unreliable power source compromises a user's ability to drill as well as causes additional problems. For example, safety may be an additional problem because certain mobile drilling applications frequently occur when the mag drill is horizontally affixed to a vertical work surface. Thus, because the electromagnetic base is powered by an AC power supply, interruption of the power supply will cause the electromagnet to lose its attractive force and the very heavy drill horizontally affixed to the vertical work surface will immediately fall from the object being machined. Another potential problem relates to drill performance. For example, because the act of drilling hardens the object being drilled, if drilling is interrupted, the effort (mechanical energy) required to resume drilling is much more than would otherwise be expended if the work object were cut continuously. This effort manifests itself in time and drill bit wear and loss and in a mobile environment, there are a limited number of available drill bits thus it is important to have a mag drill that is not susceptible to frequent power interruptions.

In the past DC drills seemed to be a viable option for the mobile environment. DC drills generally do not require an external AC power source and generally do not have the safety problems of an electromagnet. However, users may nonetheless encounter various problems with DC powered mag drills. For example, DC powered mag drills may not provide enough power for sustained mobile operations, i.e., the number of charged batteries required may be somewhat prohibitive in a mobile environment. Additionally, DC powered mag drills generally lack auto feeding functionality. Lastly, for prior art AC or DC powered mag drills, the lubrication systems associated with existing mag drills are insufficient for mobile operations. For example, existing lubrication systems are too fragile, too inflexible with their location, and do not provide sufficient lubrication when the drills are used on vertical work surfaces. Therefore a need exists for an improved magnetic drill having a reliable power source with an enhanced non-stationary lubrication system, auto feed functionality and a magnetic base that is not dependent on an AC power source to magnetically couple the drill to a work surface.

In one embodiment of the present disclosure a drill system is provided comprising an electric drill comprising a motor, a drill bit holder rotationally coupled to the motor, and a drill bit held within the drill bit holder; a first permanent magnet capable of being removeably coupled to a work piece formed of a magnetically attractive material; a coupler plate coupled to the first permanent magnet; a frame coupled to the coupler plate, the coupler plate providing an interface to couple the first permanent magnet to the frame, wherein the electric drill is coupled to the frame; an auto-feed section coupled to the electric drill adapted to apply force to the drill bit so that the drill bit traverses along a first axis so as to apply force on the drill bit and thereby engage a work piece; a lubrication input system coupled to the electric drill; a user interface operably in communication with the electric drill and the auto-feed section, the user interface providing control for powering the drill and enabling user control of the auto-feed section; a lubrication reservoir coupled to a second permanent magnet, the lubrication reservoir adapted to contain a lubricating fluid and provide a lubricant to a lubrication input section of the electric drill, the second permanent magnet capable of coupling the lubrication reservoir to a support formed of a magnetically attractive material; and a distribution tube fluidly coupling the lubrication reservoir to the lubrication input section of the electric drill, the lubrication input section further comprising a nozzle, the nozzle oriented towards the drill bit and capable of distributing lubricating fluid to the drill bit during a drilling process; wherein the first permanent magnet is formed with permanent magnet material selected to generate a first attractive force, the first attractive force is greater than a first force and less than a second force, the first force is determined based on a weight of the electric drill and a maximum force applied by the auto-feeder, and the second force is determined by a minimum amount of force required to be applied by a human to remove the first permanent magnet from the work piece, such that the second force is related to at least the weight of the electric drill, the weight of the first permanent magnet, and the first attractive force, wherein the weight of the electric drill and the weight of the first permanent magnet is at least 17 kilograms.

In another embodiment of the present disclosure a drill system is provided comprising an electric drill comprising a motor, a drill bit holder rotationally coupled to the motor, and a drill bit held within the drill bit holder; a first permanent magnet capable of being removeably coupled to a work piece formed of a magnetically attractive material; a coupler plate coupled to the first permanent magnet; a frame coupled to the coupler plate, the coupler plate providing an interface to couple the first permanent magnet to the frame, wherein the electric drill is coupled to the frame; an auto-feed section coupled to the electric drill adapted to apply force to the drill bit so that the drill bit traverses along a first axis so as to apply force on the drill bit and thereby engage a work piece; a lubrication input system coupled to the electric drill; a user interface operably in communication with the electric drill and the auto-feed section, the user interface providing control for powering the drill and enabling user control of the auto-feed section; a lubrication reservoir coupled to a second permanent magnet, the lubrication reservoir adapted to contain a lubricating fluid and provide a lubricant to a lubrication input section of the electric drill, the second permanent magnet capable of coupling the lubrication reservoir to a support formed of a magnetically attractive material; a distribution tube fluidly coupling the lubrication reservoir to the lubrication input section of the electric drill, the lubrication input section further comprising a nozzle, the nozzle oriented towards the drill bit and capable of distributing lubricating fluid to the drill bit during a drilling process; and a sensor, a controller operably coupled to the sensor, a power source operably coupled to the controller, and an electromagnet selectively powered by the power source, the electromagnet is coupled to the frame, wherein the sensor outputs to the controller a plurality of force measurements applied by the drill bit to the work piece, the controller determines if a first force threshold is exceeded based on the sensor output, wherein the controller selectively activates the electromagnet to supplement coupling functions of the first permanent magnet with additional magnetic attractive force to the work surface when the first force threshold is exceeded.

In yet another embodiment of the present disclosure a drill system is provided comprising an electric drill including an auto feed component; a controller including at least one processor and a memory, the controller being communicably coupled to the auto feed component; a lubrication system including a reservoir containing lubricant, a flexible tube coupled to the electric drill and to the reservoir, the flexible tube providing a flow path for the lubricant, a flow valve, a flow valve actuator, and at least one sensor wherein the flow valve actuator is electrically coupled to the controller and the at least one sensor is communicably coupled to the controller and configured to provide a data signal to the controller indicative of a position of the flow valve; a permanent first magnet coupled to the electric drill and a second electromagnet coupled to the electric drill and electrically coupled to the controller; a vibration sensor coupled to the electric drill and communicably coupled to the controller, the vibration sensor configured to provide a data signal to the controller indicative of a vibration profile of the electric drill; a mechanical adjustment system ("MAS") coupled to the electric drill and electrically coupled to the controller, the MAS configured to mechanically adjust the position of the electric drill relative to a work surface; a control interface communicably coupled to the controller, the control interface configured to indicate a warning and to provide one or more commands to the controller wherein the one or more commands cause the controller to at least activate the electric drill, activate the auto feed component, activate the lubrication system, and activate the MAS; and the memory containing instructions that when executed by the at least one processor cause the processor to: provide a control signal to the second electromagnet in response to the vibration profile exceeding a predetermined threshold vibration profile, the control signal causing activation of the magnetic force of the second electromagnet; provide a control signal to the electric drill in response to the vibration profile exceeding a predetermined threshold vibration profile, the control signal causing a reduction in a force applied by the electric drill relative to the work surface; and provide a control signal to the flow valve actuator to cause the flow valve to move to at least one of an opened position permitting lubricant to flow from the reservoir to the electric drill through the flexible tube and a closed position inhibiting the flow of the lubricant.

In yet another embodiment of the present disclosure a method in a drill system is provided comprising magnetically coupling, by a first permanent magnet, an electric drill to a work surface; providing, by a control interface, one or more commands to a controller wherein the one or more commands cause the controller to at least activate the electric drill, activate an auto feed component of the electric drill; activate a lubrication system, and activate a mechanical adjustment system ("MAS"); determining, by a vibration sensor, a vibration profile of the electric drill, the vibration sensor providing a data signal to the controller corresponding to the vibration profile; activating, by the controller, a second electromagnet to magnetically couple the electric drill to the work surface wherein activation of the second electromagnet occurs in response to the vibration profile exceeding a predetermined threshold vibration profile; monitoring, by a control interface, one or more operational parameters of the lubrication system, the one or more operational parameters including at least one of a valve position and a lubrication fluid flow rate; providing, by the controller, a control signal to the electric drill in response to the vibration profile exceeding a predetermined threshold vibration profile, the control signal causing a reduction in a force applied by the electric drill relative to the work surface; providing, by the controller, a control signal to a flow valve actuator of the lubrication system to cause a flow valve of the lubrication system to move to at least one of an opened position permitting a lubricant to flow from a reservoir of the lubrication system to the electric drill and a closed position inhibiting the flow of the lubricant; and adjusting, by the MAS, the position of the electric drill relative to the work surface wherein the adjusting occurs at least in response to the vibration profile exceeding a predetermined threshold vibration profile.

In yet another embodiment of the present disclosure a drill system is provided comprising an electric drill; a lubrication system including a reservoir containing lubricant, a flexible tube having a first end coupled to the reservoir and a second end coupled to the electric drill, the flexible tube providing a flow path for the lubricant; a permanent magnet coupled to the electric drill, the permanent magnet configured to magnetically couple the electric drill to a vertical work surface; a coupler plate configured to mechanically couple the magnet to the electric drill; and a first magnetic bracket coupled to the reservoir and magnetically coupled to a first metal surface, wherein the first magnetic bracket and the flexible tube cooperate to allow the reservoir to be spaced apart from and positioned independent of the location of the electric drill.

In yet another embodiment of the present disclosure a method in a drill system is provided comprising coupling, by a coupling plate, a first magnet to an electric drill; magnetically coupling, by the first magnet, the electric drill to a work surface; coupling a first end of a flexible tube to a reservoir and coupling a second end of a flexible tube to the electric drill wherein the reservoir contains lubricant; positioning, by a valve position lever, a flow control valve to at least one of an opened position and a closed position; magnetically coupling, by a first magnetic bracket, the reservoir to a first metal surface wherein the first magnetic bracket and the flexible tube cooperate to allow the reservoir to be spaced apart from and positioned independent of the location of the electric drill; and supplying, by a lubrication system, lubricant from the reservoir to the electric drill wherein lubricant is supplied from the reservoir to the electric drill when the reservoir is in an elevated location relative to the electric drill and when the flow control valve is in an opened position.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
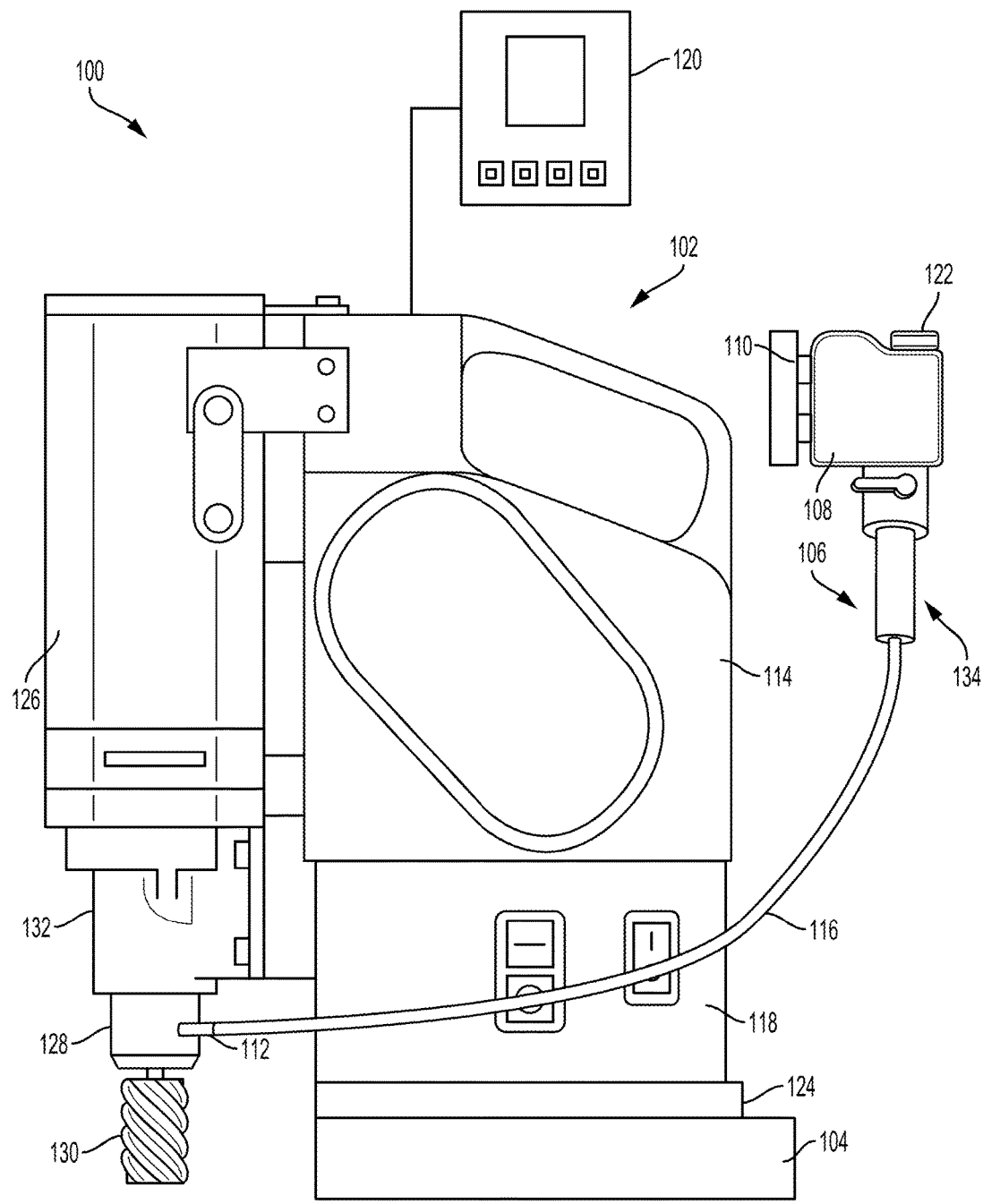
FIG. 1 shows an exemplary drill system having a detached lubrication reservoir and control interface in accordance with the present disclosure.

FIG. 1 is an exemplary illustration depicting drill system 100. Drill system 100 generally includes electric drill 102, magnet 104, lubrication system 106, electronic control panel 120 and coupling plate 124. Electric drill 102 may also be referred to as a magnetic drill or mag drill. In one embodiment of the present disclosure mag drill 102 is an AC power magnetic drill having automatic drill feed functionality. Exemplary AC powered magnetic drills with auto feed functionality include the AutoMAB 1500 manufactured by BDS® Maschinen. Referring again to the illustrative embodiment of FIG. 1, mag drill 102 includes a drill frame 114, a power switch control 118, an auto-feeder 126, a holder 128, a drill bit 130, and a slide section 132. Auto-feeder 126 is configured for automatically feeding holder 128 and drill bit 130 into an exemplary work surface, thus auto-feeder 126 may be adapted to advance or feed holder 128 toward the work surface as well as retract holder 128 away from the work surface. Power switch control 118 provides "ON" and "OFF" switch opening and switch closing functions whereby power is supplied to the drill motor when the switch is "ON" and in the closed position. Likewise, no power is supplied to the drill motor when the switch is "OFF" and in the opened position. In one embodiment of present disclosure slide section 132 may include one or more mechanical components (not shown) that are adapted to move holder 128 upwardly and downwardly along a longitudinal axis while mag drill 102 is engaged in a drilling operation.

Moreover, in one embodiment of the present disclosure, auto-feeder 126 may be designed to apply a predetermined amount of force while also moving holder 128 and drill bit 130 in a predetermined schedule of movements relative to a planned cutting operation. In various embodiments of the present disclosure and as is known in the art, a feed mechanism (not shown) generally coupled to auto-feeder 126, holder 128 and slide section 132 may be configured to facilitate the feeding of drill bit 130 into an exemplary work surface when mag drill 102 is engaged in a drilling operation. Exemplary feed mechanisms may comprise one or more movable structures mounted relative to a cutter or drill holder such as, for example, a chuck; wherein the movable structures may extend parallel with an axis of a rotary shaft assembly coupled to the cutter or drill holder. Additionally, in another embodiment of the present disclosure, a power transition section (not shown) may be included along with a clutch mechanism (not shown) that is adapted to releasably apply force to a drill holder such as holder 128. The power transition section may be coupled to the one or more moveable structures, wherein the power transition section is adapted to apply to predetermined amount of force to the one or more moveable structures to cause actuation of the feed mechanism.

As is known in the art, various types of power transition sections, such as a clutch, may be used to apply force to one or more components of mag drill 102, including componentry associated with the auto-feeder segment. In one embodiment of the present disclosure, auto-feeder 126 may also include a rack and pinion (not shown) which extends or retracts holder 128 relative to an electric motor (not shown) which applies rotational power to drill bit 130 via holder 128. In yet another embodiment, mag drill 102 may include a collar structure (not shown), which interfaces with holder 128 to permit holder 128 to move upwardly and downwardly along, for example, a power transfer axle or a shaft relative to a power motor section (not shown). In yet another embodiment, the power motor section may be electrically coupled to an electronic controller (not shown) wherein the power motor section is operated via one or more input signals provided by the controller. In one aspect of this embodiment, the power motor section may be configured to receive one or more inputs signals from an input/output device that is external to both the power motor section and the controller. Electronic control panel 120 may be coupled to the controller and configured to interface with the controller and supply one or more commands to the controller. Electronic control panel 120 and the controller are described in more detail in the disclosed embodiment of FIG. 6. In another aspect of this embodiment, the electronic controller operates the power motor section in accordance with one or more machine-readable instructions stored in a memory module residing in, for example, the controller or the input/output device. In yet another aspect of this embodiment, the one or more input signals may be provided to the power motor section through the input/output device via a signal communication medium such as a serial data port or Universal Serial Bus (USB) port.

In the illustrative embodiment of FIG. 1 mag drill 102 may be integrated with a permanent magnetic base such as magnet 104 wherein magnetic base 104 may be mechanically or magnetically coupled to mag drill 102 via coupling plate 124. In one embodiment of the present disclosure, mag drill 102 is an AC powered magnetic drill originally manufactured having an electromagnet and corresponding circuitry necessary to supply current sufficient to activate the electromagnet. In the illustrative embodiment of FIG. 1 the electromagnet is removed and mag drill 102 is integrated with a permanent magnet having a fixed and predetermined attractive magnetic force. Mag drill 102 may be adapted to include modified electronic circuitry wherein the power output circuit that initially supplied current to the originally installed electromagnet is disabled or bypassed. Integrating mag drill 102 with a permanent magnetic base 104 provides an auto-feeding mag drill with sufficient power and enhanced safety features for mobile operations. As described in more detail in the illustrative embodiment of FIG. 6, drill system 100 may nevertheless include an electromagnet configured to supplement the attractive magnetic force of permanent magnet 104.

Referring again to the illustrative embodiment of FIG. 1, lubrication system 106 includes reservoir 108, reservoir cap 122, magnetic bracket 110, tube 116, nozzle 112, and flow control means 134. Magnetic bracket 110 is coupled to reservoir 108 such that reservoir 108 may be placed in a position that is spaced apart from mag drill 102. Thus, magnetic bracket 110 enables separate coupling of reservoir 108 in a location that may be, for example, away from the exemplary work piece/work surface or directly adjacent to the exemplary work piece/work surface. As described in more detail in the disclosed embodiment of FIG. 4, magnetic bracket 110 enables reservoir 108 to be magnetically coupled to a metal surface in a location that is an elevated position relative to the location of a drilling operation performed by mag drill 102. According to the present disclosure, reservoir 108 contains lubricant (not shown) and in various embodiments of the present disclosure the lubricant or lubrication fluid flows, via tube 116, from reservoir 108 to an oil/lubricant distribution nozzle 112. Thus, lubrication system 106 provides proper and reliable flow of oil/lubricant to ensure sufficient lubrication of all pertinent angles and rotating drill components during drill operation. In one embodiment of the present disclosure, one or more generally fragile parts of lubrication system 106 may be constructed of aluminum, steel, or any similar higher strength material to overcome mechanical failures from stressors that may adversely affect lubrication system 106.

Figure 2:
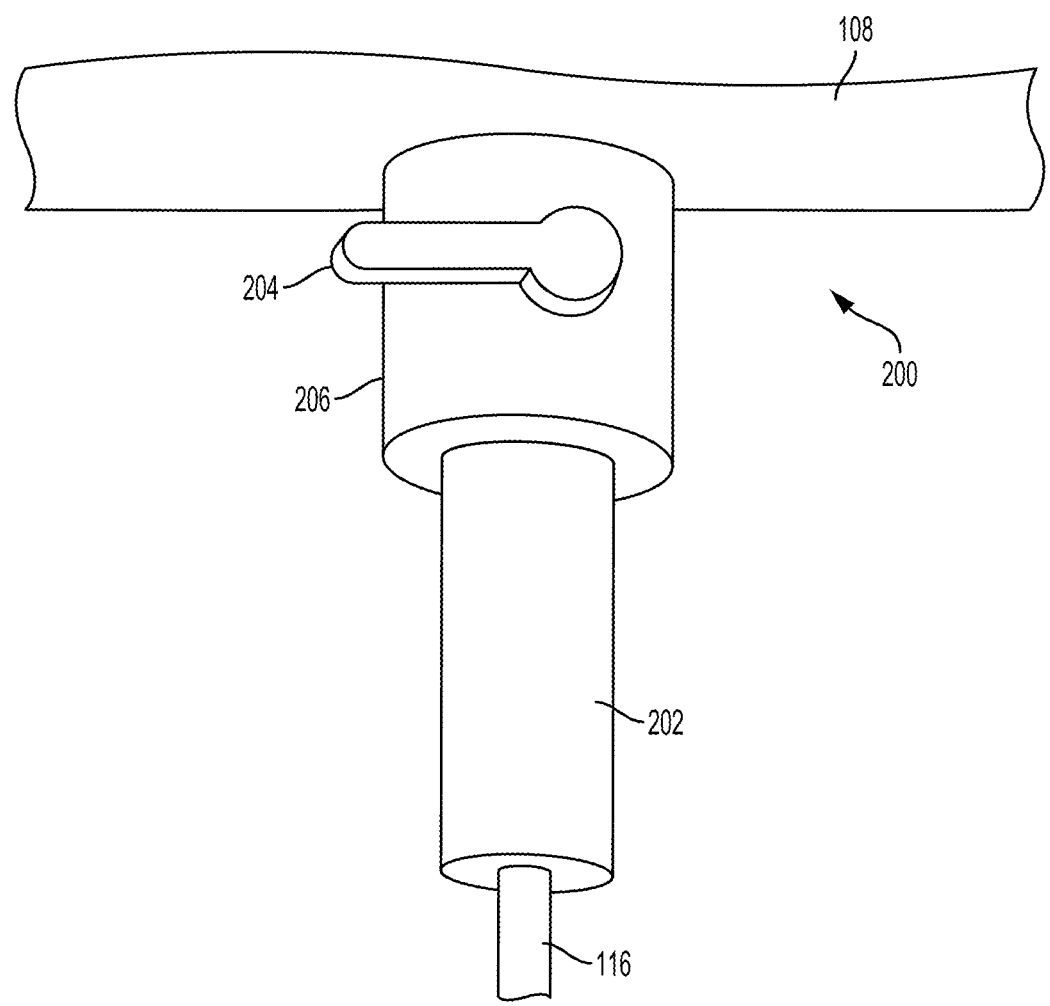
FIG. 2 shows an exemplary flow control system of the drill system of FIG. 1.

FIG. 2 is an exemplary illustration depicting flow control system 200. Flow control system 200 includes tube fitting 202, flow control lever 204, lubrication valve 206, reservoir 108 and tube 116. Lubrication valve 206 may be coupled to and generally disposed below reservoir 108, such that lubrication valve 206 may control the amount of lubricant entering tube 116. As is known in the art, lubrication valve 206 includes a valve opened position which permits lubricant to flow from reservoir 108 to nozzle 112 and into mag drill 102. Likewise, lubrication valve 206 further includes a valve closed position which inhibits the flow of lubricant from reservoir 108 to nozzle 112. Flow control lever 204 may be coupled to lubrication valve 206 wherein flow control lever 204 is adjustable via manual rotation. Flow control lever 204 functions much like an actuator configured to cause lubrication valve 206 to move between at least one of a fully opened position, a fully closed position, and any partial valve position between fully opened and fully closed. Thus, a user may manually rotate flow control lever 204 to manually adjust the flow rate of the lubricant flowing from reservoir 108 to nozzle 112. As described in further detail in the disclosed embodiment of FIG. 6 and as is generally known in the art, flow control system 200 may further include a valve actuator coupled to lubrication valve 206 and electronically coupled to a controller such that the controller may provide a control signal to the valve actuator to electronically adjust the valve position of lubrication valve 206. As such, the controller may electronically adjust the flow rate of the lubricant flowing through tube 116 per applications necessary to ensure sufficient lubrication of rotating drill components.

Figure 3:
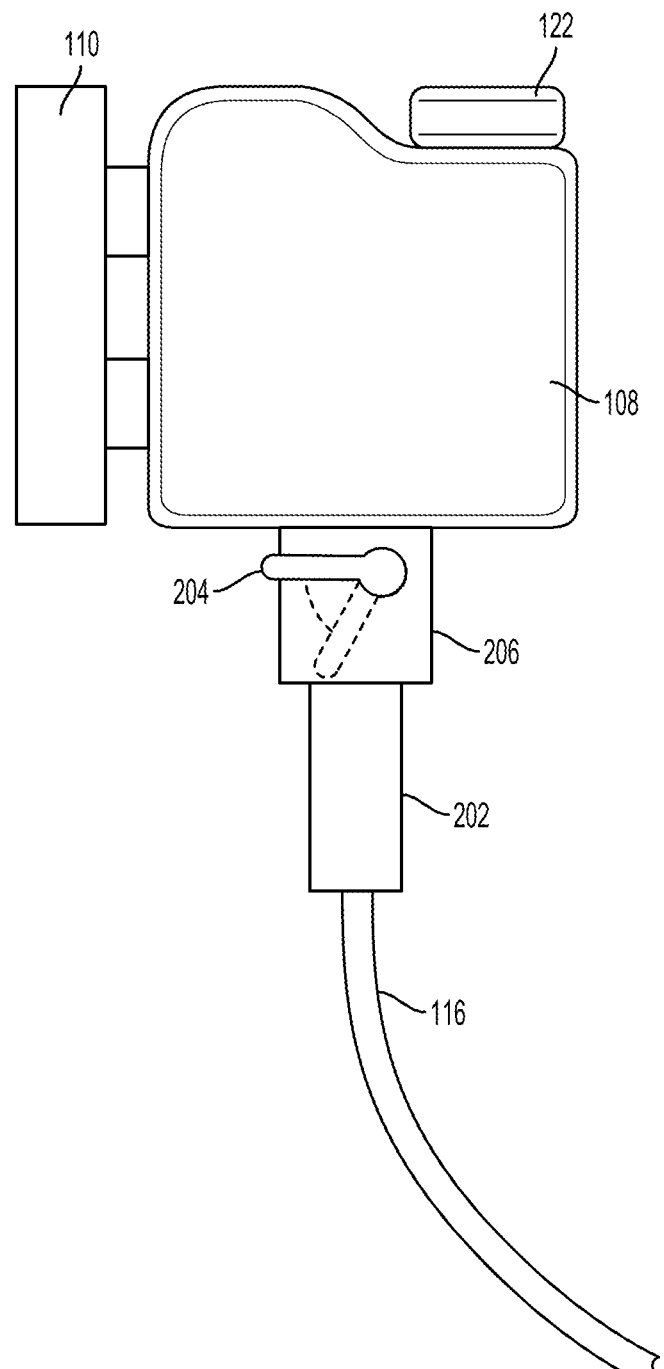
FIG. 3 shows an exemplary enlarged illustration of lubrication system in accordance with the present disclosure.

FIG. 3 is an exemplary enlarged illustration depicting lubrication system 106. According to the present disclosure and as noted above, reservoir 108 includes reservoir cap 122 configured to be securely coupled to reservoir 108 by, for example, a threaded connection. When securely coupled to reservoir 108 reservoir cap 122 ensures lubricant contained within reservoir 108 does not inadvertently leak out if reservoir 108 is tilted or oriented in a non-upright position. Magnetic bracket 110 may be coupled to reservoir 108 such that reservoir 108 may be placed in a position that is spaced apart from, for example, mag drill 102. As also noted above, flow control lever 204 may have a plurality of lever positions corresponding to valve positions of lubrication valve 206 which range between a valve fully closed position, in which reservoir 108 is not fluidly coupled to tube 116, and a valve fully opened position in which reservoir 108 is fluidly coupled to tube 116 and lubricant flow rate is not restricted by lubrication valve 206. Thus, lubrication valve 206 may be further configured to allow the optimal amount of lubricant to flow from reservoir 108 to nozzle 112 through tube 116 when lubrication valve 206 is in the fully opened position. For example, lubrication valve 206 may be designed such that the flow rate when lubrication valve 206 is fully opened is sufficient to meet lubrication needs of mag drill 102 during drilling operations.

Figure 4:
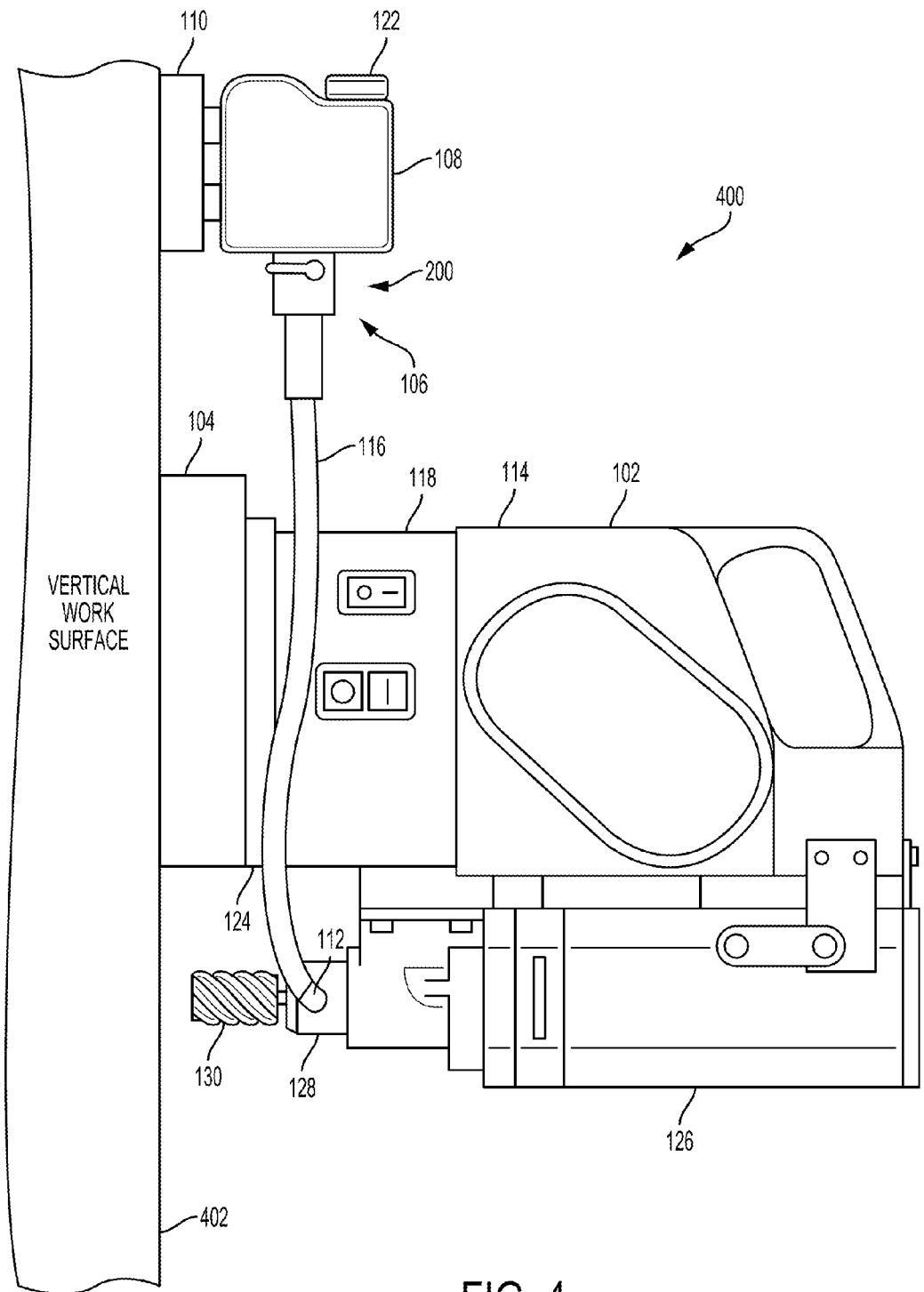
FIG. 4 shows exemplary drill system having a mag drill horizontally affixed to a vertical work surface in accordance with the present disclosure.

FIG. 4 is an exemplary illustration depicting horizontal drill system 400. As noted above, certain mobile drilling applications may occur when mag drill 102 is horizontally affixed to a work surface such as vertical work surface 402. In the illustrative embodiment of FIG. 4, horizontal drill system 400 includes mag drill 102 magnetically coupled to vertical work surface 402 through the attractive magnetic force of magnet 104. Moreover, in the illustrative embodiment of FIG. 4, magnet 104 is a permanent magnet having a fixed and predetermined attractive magnetic force, thus in this embodiment magnet 104 may also be referred to as permanent magnetic base 104. In one embodiment of the present disclosure, the fixed attractive magnetic force of permanent magnet 104 is sufficient to couple mag drill 102 to vertical work surface 402. However, the fixed attractive magnetic force of permanent magnet 104 is measured such that a user operating mag drill 102 may easily and manually remove mag drill 102 from vertical work surface 402 or an exemplary horizontal work surface by applying a removal force to remove/decouple magnet 104 and mag drill 102 from the work surface.

In one embodiment of the present disclosure permanent magnet 104 is formed with permanent magnet material selected to generate a an attractive force, wherein the attractive force is greater than a first force and less than a second force and the first force may be determined based on, for example, a weight of mag drill 102 and a maximum force applied by auto-feeder 126. The second force may be determined by a minimum amount of force required to be applied by a user to remove permanent magnet 104 from a work surface such as vertical work surface 402. The second force is related to at least the weight of mag drill 102, the weight of permanent magnet 104, and the attractive force of permanent magnet 104, wherein the weight of mag drill 102 and the weight of permanent magnet 104 is at least 17 kilograms. In one illustrative embodiment, the attractive force of permanent magnet 104 corresponds to 56.69 kilograms such that permanent magnet 104 can magnetically couple a mag drill having a combined auto-feeder force and mag drill weight of no more than 56.69 kilograms. In the illustrative embodiment of FIG. 4, mag drill 102 is horizontally affixed to vertical work surface 402. When mag drill 102 is magnetically coupled to vertical work surface 402 the minimum amount of force required to be applied by a user to remove permanent magnet 104 from the work surface will be less than the minimum amount of force required to be applied by a user to remove permanent magnet 104 from a non-vertical or horizontal work surface. For example, when mag drill 102 is magnetically coupled to vertical work surface 402 the force of gravity will at least partially assist the user in removing permanent magnet 104 from the work surface. In contrast, when mag drill 102 is magnetically coupled to a horizontal work surface the user will necessarily have to overcome the effects of the downwardly directed force of gravity when attempting to remove permanent magnet 104 from the work surface. Thus, when mag drill 102 is magnetically coupled to a horizontal work surface the second force is related, not only to at least the weight of mag drill 102, the weight of permanent magnet 104, and the attractive force, the second force may also be related to the downwardly directed force of gravity.

Utilizing permanent magnet 104 within mag drill 102 substantially mitigates safety concerns related to electromagnetic decoupling due to a loss of power being applied to a conventional mag drill integrated with an electromagnet base. As is known in the art, an electromagnet is a type of magnet in which the magnetic field that induces the attractive magnetic force is produced by an electric current. The magnetic field disappears when the current is turned off or no longer supplied by a particular power source. Conventional electromagnets usually consist of a large number of closely spaced turns of wire that create the magnetic field. Thus, because an electromagnetic base may be configured to be powered by an AC power supply, interruption of the power supply will cause the electromagnet to lose its attractive force with, for example, vertical work surface 402. If this loss of power occurs, mag drill 102, which may be heavy, will no longer have the sufficient magnetic force to remain horizontally affixed to vertical work surface 402 and will immediately fall resulting in potential injury to a user and/or substantial damage to mag drill 102. In one embodiment of the present disclosure and as described in more detail in the disclosed embodiment of FIG. 6, horizontal drill system 400 may nevertheless include an electromagnet configured to supplement the attractive magnetic force of permanent magnet 104. The supplemental electromagnet may be electrically coupled to a controller and the controller may be configured to supply power to the electromagnet to activate the magnetic coupling function.

Horizontal drill system 400 includes reservoir 108 positioned generally above mag drill 102. As described above, magnetic bracket 110 coupled to reservoir 108 enables reservoir 108 to be placed in a position that is spaced apart from mag drill 102. Thus, magnetic bracket 110 enables reservoir 108 to be magnetically coupled to vertical work surface 402 in a location that is an elevated position relative to the location of a drilling operation performed by mag drill 102. Additionally, in the illustrative embodiment of FIG. 4, because reservoir 108 is positioned above mag drill 102, the flow of lubricant contained within reservoir 108 is gravity assisted. Therefore, lubricant or lubrication fluid flows, via tube 116, from reservoir 108 under the influence of gravity to nozzle 112. Thus, lubrication system 106 provides reliable flow of lubricant to ensure sufficient lubrication of pertinent angles and rotating drill components within holder 128 during drill operation.

Figure 5:
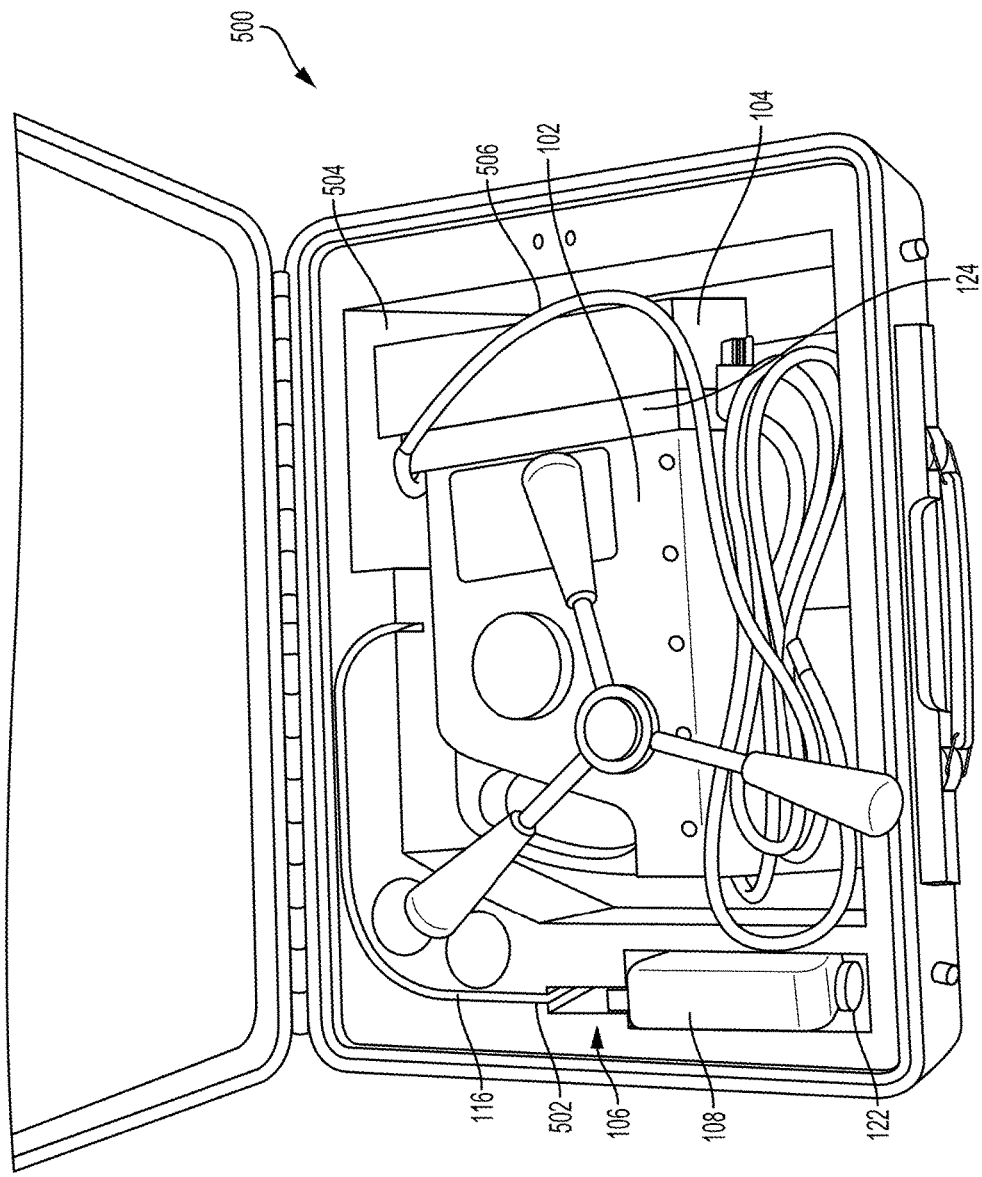
FIG. 5 shows an exemplary storage container for storing the drill system of FIG. 1.

FIG. 5 is an exemplary illustration depicting a storage container configured for storing and/or transporting drill system 100. Storage container 500 includes a first section 502 for storing one or more components included with lubrication system 106 and a second section 504 for storing one or more components included with mag drill 102. Exemplary one or more components included with lubrication system 106 and stored within first section 502 include reservoir 108, reservoir cap 122, and tube 116. Likewise, exemplary one or more components included with mag drill 102 and stored within second section 504 include magnet 104 and coupling plate 124. Storage container 500 may be designed to have specific cavities for drill system 100 and all of its components so that drill system 100 may be safely transferred or transported while in a mobile out-door environment. Thus, storage container 500 allows drill system 100 to be utilized in the mobile out-door environment while still protecting drill system 100 from undesirable exposure to potential hazards such as moisture.

Figure 6:
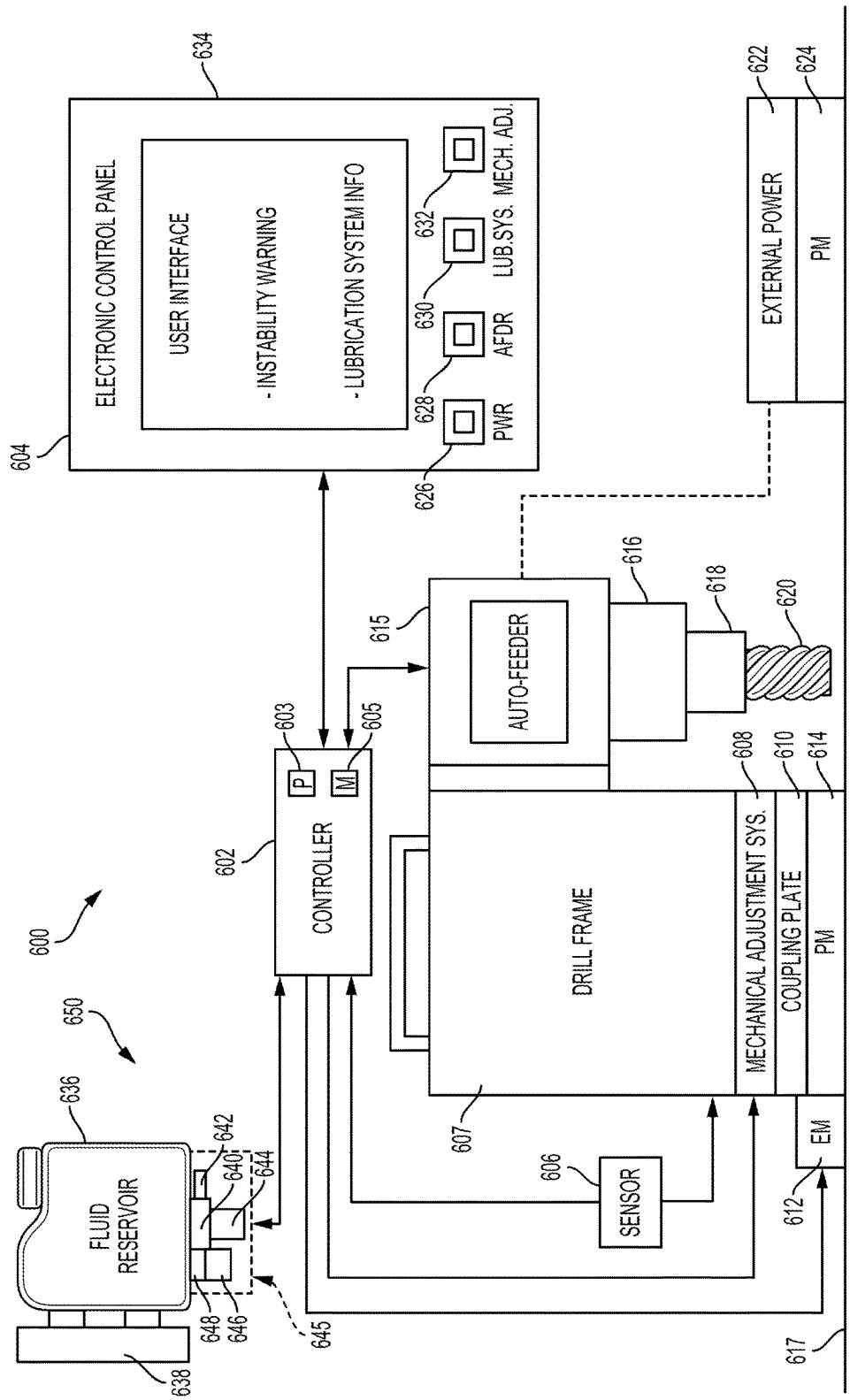
FIG. 6 shows an exemplary drill system schematic having a detached lubrication reservoir and control interface in accordance with the present disclosure.

FIG. 6 is an exemplary drill system schematic depicting drill system 600. Drill system 600 generally includes controller 602, electronic control panel ("ECP") 604, vibration sensor 606, mag drill 607, lubrication system 650, external power 622, and permanent magnet 624. Controller 602 includes at least one processor 603 and memory 605 wherein memory 605 contains instructions that when executed by the at least one processor cause processor 603 to provide, via controller 602, one or more signals to one or more components included in drill system 600 as well receive, via controller 602, one or more signals provided by the one or more components included in drill system 600. Controller 602 is communicably coupled to ECP 604, auto-feeder 615, electronic valve system ("EVS") 645 and vibration sensor 606. ECP 604 includes: user interface 634—to display warning indicators and system info to the user; power button 626—to supply power to mag drill 607; auto-feeder button 628—to activate the auto-feeding function of mag drill 607; lubrication system button 630—to activate and monitor lubrication system 650; and mechanical adjustment system ("MAS") button 632—to activate the automatic mechanical adjustment function of mag drill 607.

In addition to the componentry described above in the disclosed embodiment of FIG. 1, auto-feeder 615 may further include one or more force sensors or force transducers (not shown) which convert an inputted mechanical force into an electrical output signal received by controller 602. In one embodiment of the present disclosure, auto-feeder 615 may provide an output signal to controller 602 indicating a force being applied to work surface 617 by, for example, holder 618 and drill bit 620 being fed toward work surface 617. Processor 603 may execute programmed logic or one or more programmed instructions stored within memory 605 to compare the measured force to a predetermined threshold force value. Processor 603, through execution of the programmed logic/instructions, may determine that the current applied force has exceeded the predetermined threshold force, thus processor 603 may further execute one or more instructions to provide a control signal to auto-feeder 615 to reduce the force being applied to exemplary work surface 617 by holder 618 and drill bit 620. Accordingly, controller 602 and auto-feeder 615 may be configured such that when a user activates auto-feeder 615 via auto-feeder button 628, processor 603 of controller 602 begins to monitor the signal provided the one or more force transducers. Therefore, controller 602 will automatically reduce force applied by auto-feeder 615 and/or drill bit 620 against work surface 617 when processor 603 detects that the predetermined force threshold has been exceeded.

In the illustrative embodiment of FIG. 6 EVS 645 includes lubrication valve 640, manual override lever 642, fitting 644, valve actuator 646, and valve sensor 648. As is known in the art, a valve actuator is a mechanism for opening and closing a valve. Manually operated valves require a user to adjust the valve using, for example, a direct or geared mechanism attached or coupled to the valve stem. Electrically operated valve actuators such as valve actuator 646 allow a valve to be adjusted remotely by a remote user and/or autonomously by a preprogrammed control system. As is also known in the art, valve position sensors such as valve sensor 648 permit valve position measurement and are generally configured to provide an electrical output signal corresponding to a particular valve position measurement. In one embodiment of the present disclosure, controller 602 may be configured to provide one or more control signals to valve actuator 646 corresponding to a desired valve position and valve sensor 648 may be configured to provide one or more response signals indicating an actual valve position measurement. Processor 603 may execute programmed logic or one or more programmed instructions stored within memory 605 to compare the desired valve position to the actual valve position measurement to verify proper functionality of EVS 645. Accordingly, controller 602 and EVS 645 may be configured such that when a user activates lubrication system 650 via lubrication system button 630, controller 602 provides a control signal to valve actuator 646 indicating a desired valve position wherein valve sensor 648 provides a response signal indicating an actual valve position measurement. In one aspect of this embodiment, controller 602 provides a control signal to valve actuator 646 to cause lubrication valve to move to at least one of an opened position permitting lubricant to flow from reservoir 636 toward mag drill 607 through a flexible tube and a closed position inhibiting the flow of the lubricant.

In another embodiment of the present disclosure, EVS 645 may further include a flow sensor (not shown) generally disposed adjacent lubrication valve 640 and configured to provide an electrical output signal indicative of a flow rate of lubricant flowing from reservoir 636 via lubrication valve 640. As is also known in the art, a flow sensor is a device for sensing the rate of fluid flow. Conventional flow sensors include a sensing element to record the flow of fluids wherein the magnitude of the output signal is proportional to the velocity of the fluid/lubricant flowing past the sensing element. In one aspect of this embodiment, when a user activates lubrication system 650 via lubrication system button 630 controller 602 may then receive a flow sensor output signal corresponding to the lubricant flow rate. Controller 602 may then output a corresponding electrical signal to user interface 634 that is converted by user interface 634 to digital numerical value displayed as information regarding a flow rate associated with lubrication system 650.

As noted above, in the illustrative embodiment of FIG. 6, drill system 600 includes vibration sensor 606 coupled to mag drill 607 and communicably coupled to controller 602. Exemplary vibration sensors include accelerometers configured to measure vibration levels associated with rotating or high shock/vibrating machinery by converting abrupt mechanical motion into an electrical output signal. In one embodiment of the present disclosure, vibration sensor 606 may provide an output signal to controller 602 indicating a vibration profile associated with mag drill 607 while mag drill 607 is engaged in a particular drilling operation against work surface 617. Processor 603 may execute programmed logic or one or more programmed instructions stored within memory 605 to compare the measured vibration profile to a predetermined threshold vibration profile. Processor 603, through execution of the programmed logic/instructions, may determine that the current or actual vibration profile has exceeded the predetermined threshold vibration profile, thus processor 603 may further execute one or more instructions to provide a control signal to auto-feeder 615 to reduce the force being applied to exemplary work surface 617 by holder 618 and drill bit 620. A reduction in the force applied by holder 618 and drill bit 620 corresponds to a reduced vibration profile. Thus, controller 602 may be configured to automatically reduce force applied by auto-feeder 615 or drill bit 620 against work surface 617 when vibration sensor 606 and controller 602 detects a potential instability of mag drill 607 caused by operation of mag drill 607 that might lead to the drill magnetically decoupling from work surface 617.

In the illustrative embodiment of FIG. 6, drill system 600 further includes coupling plate 610, electromagnet 612, permanent magnet 614, and mechanical adjustment system ("MAS") 608. Coupling plate 610 may provide the necessary mechanical linkage to couple permanent magnet 614 to mag drill 607. As indicated above, an electromagnet such as electromagnet 612 is a type of magnet in which the magnetic field that induces the attractive magnetic force is produced by an electric current. In one embodiment of the present disclosure, when processor 603 determines that the current or actual vibration profile has exceeded the predetermined threshold vibration profile, processor 603 may execute one or more instructions to provide a controlled current signal to electromagnet 612 to induce an attractive magnet force and provide additional magnetic coupling. In this embodiment, electromagnet 612 provides an additional magnetic force which supplements the magnet force of permanent magnet 614 to ensure that mag drill 607 remains magnetically coupled to work surface 617 when the actual vibration profile exceeds a predetermined threshold vibration profile. Thus, controller 602 may selectively activate electromagnet 612 to supplement the coupling function of permanent magnet 614 with additional magnetic attractive force when vibration sensor 606 indicates mag drill 607 is becoming unstable in its coupling to work surface 617. In a further illustrative embodiment the attractive force of permanent magnet 614 and electromagnet 612 corresponds to 56.69 kilograms such that permanent magnet 614 and electromagnet 612 can magnetically couple, to work surface 617, a mag drill having a combined auto-feeder force and mag drill weight of no more than 56.69 kilograms. It may be appreciated that deactivation of electromagnet 612 will reduce the total magnetic attractive force of permanent magnet 614 and electromagnet 612 thereby assisting the user in decoupling mag drill 607 from work surface 617.

In another illustrative embodiment, MAS 608 may be electrically coupled to controller 602 and controller 602 may be configured to provide one or more control signals to cause MAS 608 to mechanically adjust mag drill 607 relative to work surface 617. MAS 608 includes one or more mechanical adjustment means including at least one of an electric motor, a gear system, one or more hydraulics and one or more springs wherein the mechanical adjustments means are configured to cause automatic adjustment of mag drill 607 relative to work surface 617. In one aspect of this embodiment vibration sensor 606 may further include at least one of an electronic level detection device and a laser device configured to determine a relative distance between the electric drill and the work surface. So, vibration sensor 606 may provide an output signal to controller 602 indicating an actual tilt or angle of mag drill 607 which corresponds to the position of mag drill 607 relative to work surface 617. Processor 603 may execute programmed logic or one or more programmed instructions stored within memory 605 to compare the measured tilt or angle to a predetermined threshold tilt or angle. If processor 603 determines that the current or actual tilt has exceeded the predetermined threshold tilt, processor 603 may execute one or more instructions to provide one or more control signals to MAS 608 to cause automatic adjustment of mag drill 607 relative to work surface 617. Accordingly, controller 602 may be configured such that when a user activates MAS 608 via MAS button 632, processor 603 of controller 602 begins to monitor the signal provided vibration sensor 606 indicating the tilt or angle of mag drill 607 relative to work surface 617. As such, controller 602 will automatically adjust the level/tilt or angle of mag drill 607 when processor 603 determines that the predetermined threshold tilt has been exceeded. Thus, the drill frame of mag drill 607 may house a mechanical means for enabling mag drill 607 to be automatically adjusted relative to a particular work surface in order to create a level and therefore ideal drilling environment.

Likewise in yet another embodiment, when processor 603 determines that the current or actual vibration profile has exceeded the predetermined threshold vibration profile, processor 603 may execute one or more instructions to provide one or more control signals to ECP 604 to cause illumination of a warning status indicator. In one aspect of this embodiment, the one or more control signals are converted by user interface 634 to digital text displayed as information to indicate an instability warning status in response to the vibration profile exceeding a predetermined threshold vibration profile. In yet another embodiment drill system 600 may include a warning system for instability generally coupled to vibration sensor 606 wherein the warning indicators are adjustable relative to a degree of instability or potential decoupling of magnet 614 from work surface 617. In one aspect of this embodiment a warning light (not shown) or other indicator may be provided which signals to a user an impending instability of mag drill 607 based on a control signal from controller 602 provided to ECP 604 indicating that magnet 614 and electromagnet 612 are being overcome by either force applied by mag drill 607 to work surface 617 or another factor. As indicated above, sensors used to detect instability may include an electronic level detection device (such as devices used in thermostats with mercury in an enclosure which closes electrical contacts), an accelerometer, a laser measuring relative distance from mag drill 607 to work surface 617, or another mechanism which detects loss of coupling or slight movement of mag drill 607 away from work surface 617.

In the illustrative embodiment of FIG. 6, drill system 600 may include external power supply 622 coupled to work surface 617 using magnetic structures such as permanent magnet 624. During certain mobile drilling applications, mag drill 607 may require electrical coupling to an external power source such as a standard 115-volt outlet (not shown). External power supply 622 may provide coupling to a standard 115-volt outlet to power mag drill 607 as well as other components of drill system 600.

Figure 7:
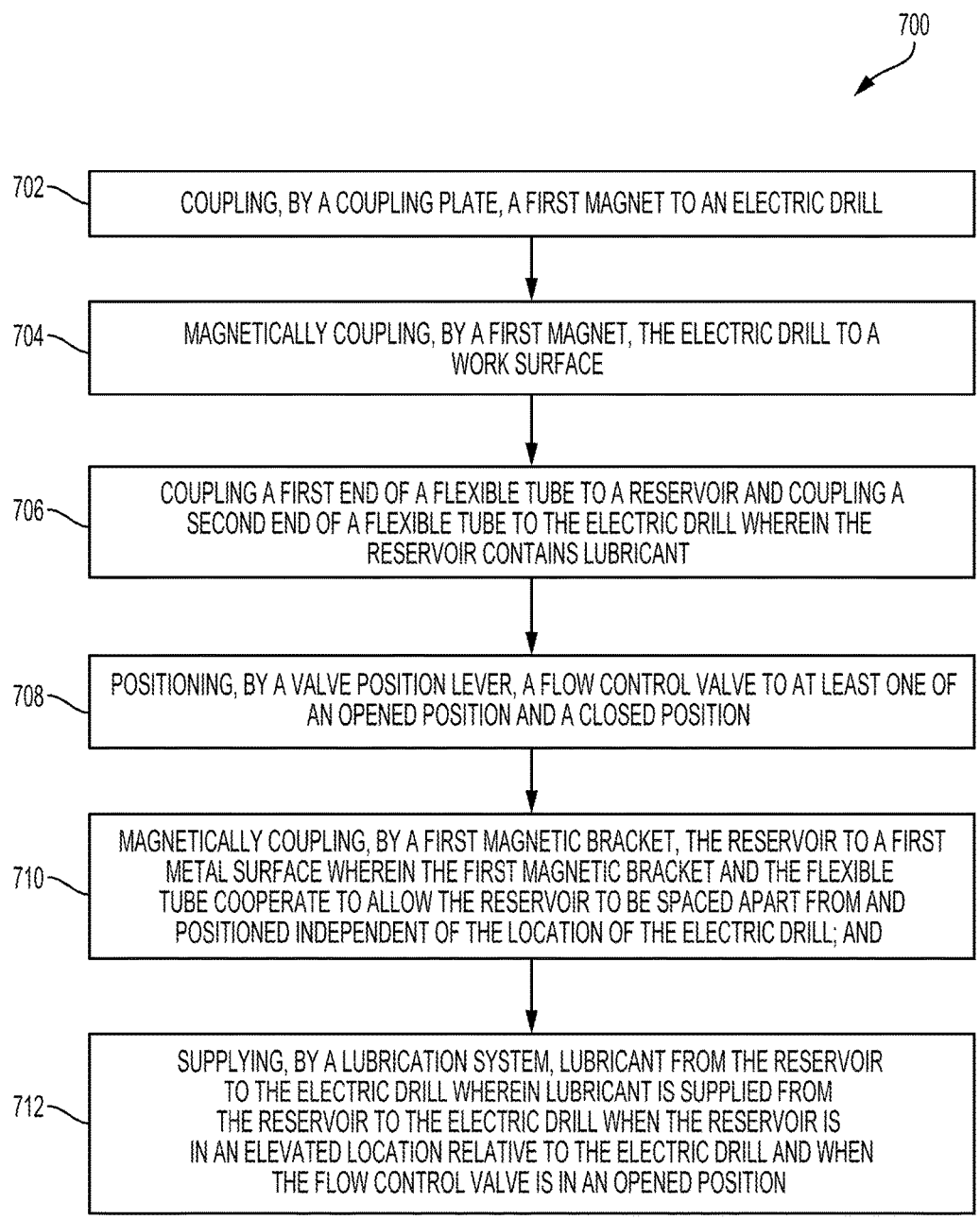
FIG. 7 shows a flow diagram of an exemplary method of operation of the drill system of FIG. 1 and FIG. 4.

FIG. 7 shows a flow diagram of an exemplary method of operation of the drill system of FIG. 1 and FIG. 4. The illustrative embodiment of method 700 includes a plurality of steps for operating one or more drill systems such as drill system 100 or horizontal drill system 400. At block 702 method 700 begins by a user coupling magnet 104 to mag drill 102 by using coupling plate 124. The method then proceeds to block 704 wherein a user magnetically couples, via magnet 104, mag drill 102 to an exemplary work surface such as work surface 402. At block 706 a user may then couple a first end of tube 116 to reservoir 108 via fitting 202 wherein reservoir 108 may also be filled with lubricant. Likewise, a user may then couple a second end of tube 116 to holder 128 of mag drill 102 via nozzle 112. At block 708 a user may then position, via a flow control lever such as lever 204, lubrication valve 206 to at least one of an opened position permitting flow of lubricant from reservoir 108 to mag drill 102 and a closed position inhibiting the flow of lubricant from reservoir 108. At block 710 a user may magnetically couple reservoir 108, via magnetic bracket 110, to a magnetically attractive surface such as work surface 402 wherein magnetic bracket 110 and tube 116 cooperate to allow reservoir 108 to be spaced apart from and positioned independent of the location of mag drill 102. At block 712 a user may then supply lubricant to mag drill 102 via lubrication system 106 wherein lubricant is supplied from reservoir 108 to mag drill 102 when reservoir 108 is in an elevated location relative to mag drill 102 and when lubrication valve 206 is in an opened position.

Figure 8:
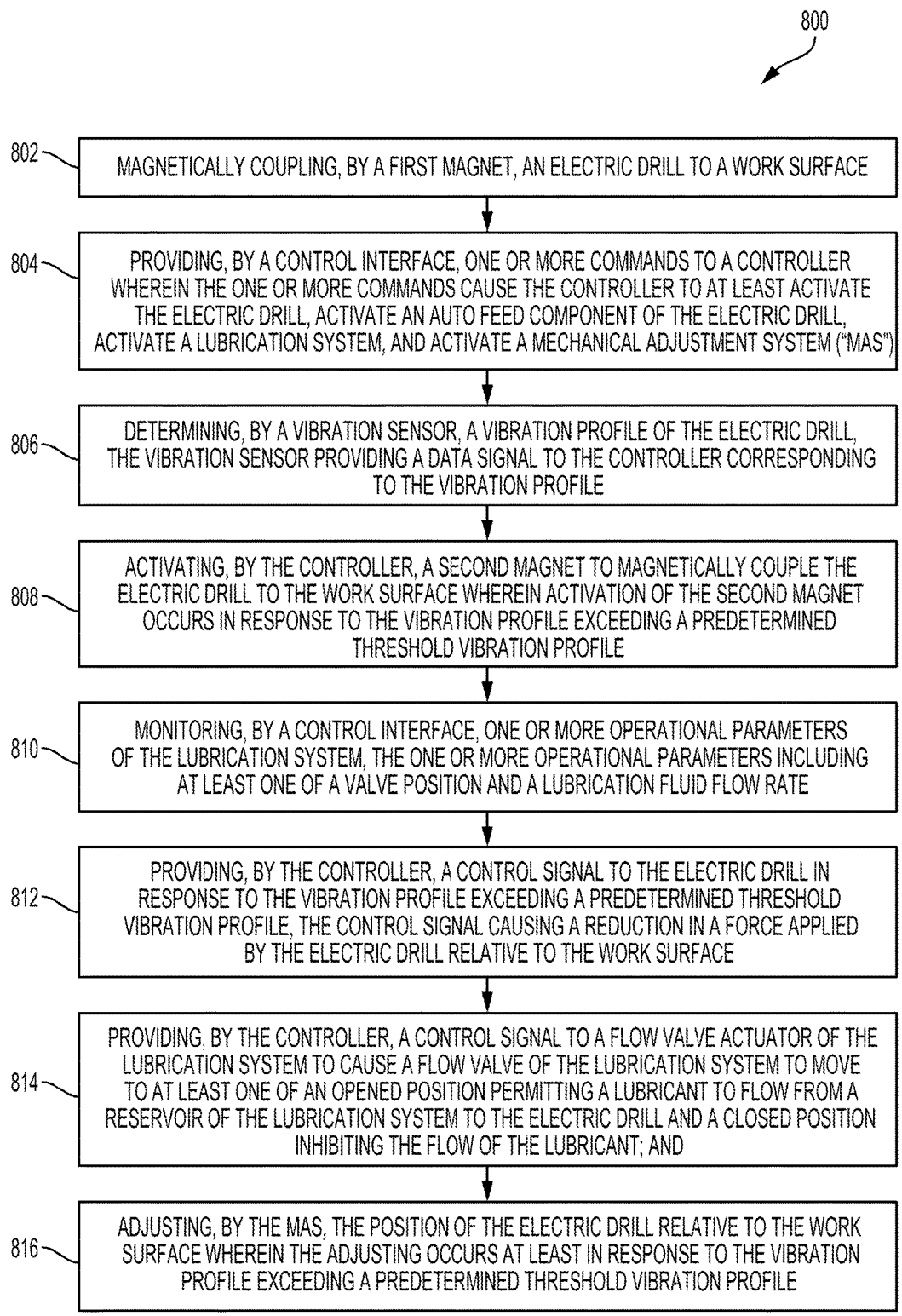
FIG. 8 shows a flow diagram of an exemplary method of operation of the drill system of FIG. 6.

FIG. 8 shows a flow diagram of an exemplary method of operation of the drill system of FIG. 6. The illustrative embodiment of method 800 includes a plurality of steps for operating a drill system such as drill system 600. At block 802 method 800 begins by magnetically coupling, via magnet 614, mag drill 607 to an exemplary work surface such as work surface 617. The method then proceeds to block 804 wherein a user may provide, via ECP 604, one or more commands to controller 602 wherein the one or more commands cause controller 602 to at least activate mag drill 607, activate auto-feeder 615 of mag drill 607; activate lubrication system 650, and activate mechanical adjustment system ("MAS") 608. At block 806 the method determines, via vibration sensor 606, a vibration profile of mag drill 607, wherein vibration sensor 606 provides a data signal to controller 602 corresponding to the vibration profile. At block 808 the method activates an attractive magnet force of a magnet such as magnet 612, via a control signal from controller 602, to magnetically couple mag drill 607 to an exemplary work surface such as work surface 617 wherein activation of magnet 612 occurs in response to the vibration profile exceeding a predetermined threshold vibration profile.

At block 810 the method monitors, via a control interface such as user interface 634, one or more operational parameters of lubrication system 650, one or more operational parameters including at least one of a valve position of lubrication valve 640 and a lubrication fluid flow rate of the lubricant flowing from reservoir 636. At block 812 the method provides, via controller 602, a control signal to mag drill 607 in response to the vibration profile exceeding a predetermined threshold vibration profile, wherein the control signal causes a reduction in the force applied by, for example, auto-feeder 615 of mag drill 607 feeding drill bit 620 toward work surface 617 during an exemplary drilling operation. At block 814 the method provides, via controller 602, a control signal to a valve actuator such as valve actuator 646 of lubrication system 650 to cause lubrication valve 640 of lubrication system 650 to move to at least one of an opened position permitting a lubricant to flow from reservoir 636 of the lubrication system 650 to mag drill 607 and a closed position inhibiting the flow of the lubricant from reservoir 636. At block 816 the method adjusts, via MAS 608, the position or tilt/angle of mag drill 607 relative to work surface 617 wherein the adjusting occurs at least in response to the vibration profile exceeding a predetermined threshold vibration profile.

In the foregoing specification, specific embodiments of the present disclosure have been described. However, one of ordinary skill in the art will appreciate that various modifications and changes can be made without departing from the scope of the disclosure as set forth in the claims below. Accordingly, the specification and figures are to be regarded in an illustrative rather than a restrictive sense, and all such modifications are intended to be included within the scope of disclosure. The benefits, advantages, solutions to problems, and any element(s) that may cause any benefit, advantage, or solution to occur or become more pronounced are not to be construed as critical, required, or essential features or elements of any or all the claims. The disclosure is defined solely by the appended claims including any amendments made during the pendency of this application and all equivalents of those claims as issued. Although the invention has been described in detail with reference to certain preferred embodiments, variations and modifications exist within the spirit and scope of the invention as described and defined in the following claims.

The invention claimed is:

1. A drill system comprising:
an electric drill comprising a motor, a drill bit holder rotationally coupled to the motor, and a drill bit held within the drill bit holder;
a first permanent magnet capable of being removeably coupled to a work piece formed of a magnetically attractive material;
a coupler plate coupled to the first permanent magnet;
a frame coupled to the coupler plate, the coupler plate providing an interface to couple the first permanent magnet to the frame, wherein the electric drill is coupled to the frame;
an auto-feed section coupled to the electric drill adapted to apply force to the drill bit so that the drill bit traverses along a first axis so as to apply force on the drill bit and thereby engage a work piece;
a user interface operably in communication with the electric drill and the auto-feed section, the user interface providing control for powering the drill and enabling user control of the auto-feed section;
a mechanical adjustment system ("MAS") coupled to the electric drill, the MAS configured to mechanically adjust position or orientation of the electric drill relative to a work piece;
an electromagnet coupled with the electric drill that is configured to be in contact with the work piece and selectively augment the first permanent magnet's force coupling with the work piece;
a lubrication input system coupled to the electric drill, the lubrication input system including a lubrication reservoir coupled to a second permanent magnet, the lubrication reservoir adapted to contain a lubricating fluid and provide a lubricant to a lubrication input section of the electric drill, the second permanent magnet capable of coupling the lubrication reservoir to a support formed of a magnetically attractive material; and
a distribution tube fluidly coupling the lubrication reservoir to the lubrication input section of the electric drill, the lubrication input section further comprising a nozzle, the nozzle oriented towards the drill bit and capable of distributing lubricating fluid to the drill bit during a drilling process;
wherein the first permanent magnet is formed with permanent magnet material selected to generate a first attractive force, the first attractive force is greater than a first force and less than a second force, the first force is determined based on a weight of the electric drill and a maximum force applied by the auto-feeder, and the second force is determined by a minimum amount of force required to be applied by a human to remove the first permanent magnet from the work piece, such that the second force is related to at least the weight of the electric drill, the weight of the first permanent magnet, and the first attractive force, wherein the weight of the electric drill and the weight of the first permanent magnet is at least 17 kilograms;
the lubrication system further including a flow control valve and a valve position lever configured to move the flow control valve to at least one of an opened position and a closed position, wherein lubricant flows from the reservoir to the electric drill when the reservoir is in an elevated location relative to the electric drill and when the flow control valve is in an opened position;
a sensor; and
a controller operably coupled to the sensor, a power source operably coupled to the controller, wherein the controller operates the electromagnet to be selectively powered by the power source, the electromagnet is coupled to the frame, wherein the sensor outputs to the controller a plurality of force measurements applied by the drill bit to the work piece, the controller determines if a first force threshold is exceeded based on the sensor output, wherein the controller selectively activates the electromagnet to supplement coupling functions of the first permanent magnet with additional magnetic attractive force to the work surface when the first force threshold is exceeded.

2. The drill system of claim 1, further comprising a sensor adapted to measure force applied by the drill against the work piece and a controller adapted to receive a sensor output signal indicating the measured force, wherein the controller automatically reduces force applied by at least one of the auto-feeder and the drill against a work surface when the sensor output signal indicates the measured force applied by the drill exceeds a first force threshold.

3. The drill system of claim 1, further comprising a warning system which outputs a warning signal to a user when the first force threshold is exceeded.

4. The drill system of claim 2, further comprising a warning system which outputs a warning signal to a user when the first force threshold is exceeded.

5. A drill system comprising:
an electric drill comprising a motor, a drill bit holder rotationally coupled to the motor, and a drill bit held within the drill bit holder;
a first permanent magnet capable of being removeably coupled to a work piece formed of a magnetically attractive material;
a coupler plate coupled to the first permanent magnet;
a frame coupled to the coupler plate, the coupler plate providing an interface to couple the first permanent magnet to the frame, wherein the electric drill is coupled to the frame;
an auto-feed section coupled to the electric drill adapted to apply force to the drill bit so that the drill bit traverses along a first axis so as to apply force on the drill bit and thereby engage a work piece;
a mechanical adjustment system ("MAS") coupled to the electric drill, the MAS configured to mechanically adjust position or orientation of the electric drill relative to a work piece;
a user interface operably in communication with the electric drill and the auto-feed section, the user interface providing control for powering the drill and enabling user control of the auto-feed section;
a lubrication input system coupled to the electric drill, the lubrication input system including a lubrication reservoir coupled to a second permanent magnet, the lubrication reservoir adapted to contain a lubricating fluid and provide a lubricant to a lubrication input section of the electric drill, the second permanent magnet capable of coupling the lubrication reservoir to a support formed of a magnetically attractive material;
a distribution tube fluidly coupling the lubrication reservoir to the lubrication input section of the electric drill, the lubrication input section further comprising a nozzle, the nozzle oriented towards the drill bit and capable of distributing lubricating fluid to the drill bit during a drilling process; and
a sensor, a controller operably coupled to the sensor, a power source operably coupled to the controller, and an electromagnet selectively powered by the power source, the electromagnet is coupled to the frame, wherein the sensor outputs to the controller a plurality of force measurements applied by the drill bit to the work piece, the controller determines if a first force threshold is exceeded based on the sensor output, wherein the controller selectively activates the electromagnet to supplement coupling functions of the first permanent magnet with additional magnetic attractive force to the work surface when the first force threshold is exceeded.

6. The drill system of claim 5, wherein the controller automatically reduces force applied by the auto-feeder or drill against the work surface when the sensor outputs indicate the force applied by the drill exceeds the first force threshold.

7. The drill system of claim 5, further comprising a warning system which outputs a warning signal to a user when the first force threshold is exceeded.

8. The drill system of claim 5, wherein the first permanent magnet is formed with permanent magnet material selected to generate a first attractive force, the first attractive force is greater than a first force and less than a second force, the first force is determined based on a weight of the electric drill and a maximum force applied by the auto-feeder, and the second force is determined by a minimum amount of force required to be applied by a human to remove the first permanent magnet from the work piece, such that the second force is related to at least the weight of the electric drill, the weight of the first permanent magnet, and the first attractive force, wherein the weight of the electric drill and the weight of the first permanent magnet is at least 17 kilograms.

9. A drill system comprising:
an electric drill including a drill bit and an auto-feed component;
a controller including at least one processor and a memory, the controller being communicably coupled to the auto feed component;
a lubrication system including a reservoir containing lubricant, a flexible tube coupled to the electric drill and to the reservoir, the flexible tube providing a flow path for the lubricant, a flow valve, a flow valve actuator, and at least one sensor wherein the flow valve actuator is electrically coupled to the controller and the at least one sensor is communicably coupled to the controller and configured to provide a data signal to the controller indicative of a position of the flow valve;
a first permanent magnet coupled to the electric drill and a second electromagnet coupled to the electric drill and electrically coupled to the controller;
a vibration sensor coupled to the electric drill and communicably coupled to the controller, the vibration sensor configured to provide a data signal to the controller indicative of a vibration profile of the electric drill;
a mechanical adjustment system ("MAS") coupled to the electric drill and electrically coupled to the controller, the MAS configured to mechanically adjust the position of the electric drill relative to a work surface;
a control interface communicably coupled to the controller, the control interface configured to indicate a warning and to provide one or more commands to the controller wherein the one or more commands cause the controller to at least rotate the drill bit of the electric drill, activate the auto feed component, activate the lubrication system, and activate the MAS; and
the memory containing instructions that when executed by the at least one processor cause the processor to:
provide a control signal to the second electromagnet in response to the vibration profile exceeding a predetermined threshold vibration profile, the control signal causing activation of the magnetic force of the second electromagnet;
provide a control signal to the electric drill in response to the vibration profile exceeding a predetermined threshold vibration profile, the control signal causing a reduction in a force applied by the electric drill relative to the work surface; and
provide a control signal to the flow valve actuator to cause the flow valve to move to at least one of an opened position permitting lubricant to flow from the reservoir to the electric drill through the flexible tube and a closed position inhibiting the flow of the lubricant.

10. The drill system of claim 9, further including a coupler plate wherein the coupler plate has a rectangular shape and is configured to mechanically couple at least the first magnet to the electric drill.

11. The drill system of claim 9, wherein the flexible tube permits the reservoir to be spaced apart from and positioned independent of the location of the electric drill.

12. The drill system of claim 11, further including a first magnetic bracket coupled to the reservoir wherein the first magnetic bracket permits the reservoir to be magnetically coupled to a first metal surface and a second magnetic bracket coupled to an external power supply wherein the second magnetic bracket permits the external power supply to be magnetically coupled to a second metal surface, the external power supply being configured to supply power to the electric drill.

13. The drill system of claim 9, wherein the MAS includes one or more mechanical adjustment means including at least one of an electric motor, a gear system, one or more hydraulics and one or more springs wherein the mechanical adjustments means are configured to cause automatic adjustment of the electric drill relative to the work surface.

14. The drill system of claim 9, wherein the memory further includes instructions that when executed by the at least one processor cause the processor to provide a control signal to the control interface to cause illumination of a warning status indicator in response to the vibration profile exceeding a predetermined threshold vibration profile.

15. The drill system of claim 9, wherein the vibration sensor includes at least one of an electronic level detection device, an accelerometer, and a laser device configured to determine a relative distance between the electric drill and the work surface.

16. The drill system of claim 9, wherein the lubrication system further includes a flow sensor communicably coupled to the controller and the control interface includes a display configured to display data corresponding to the lubrication system, the data including a lubrication fluid flow rate.

17. The drill system of claim 9, wherein the memory further includes instructions that when executed by the at least one processor cause the processor to provide one or more control signals to the auto feed component to cause movement of a drill bit holder in a predetermined drilling pattern.

18. A method in a drill system comprising:
magnetically coupling, by a first permanent magnet, an electric drill to a work surface;
providing, by a control interface, one or more commands to a controller wherein the one or more commands cause the controller to at least activate a drill bit of the electric drill, activate an auto feed component of the electric drill, activate a lubrication system, and activate a mechanical adjustment system ("MAS");
determining, by a vibration sensor, a vibration profile of the electric drill, the vibration sensor providing a data signal to the controller corresponding to the vibration profile;
activating, by the controller, a second electromagnet to magnetically couple the electric drill to the work surface wherein activation of the second electromagnet occurs in response to the vibration profile exceeding a predetermined threshold vibration profile;
monitoring, by a control interface, one or more operational parameters of the lubrication system, the one or more operational parameters including at least one of a valve position and a lubrication fluid flow rate;
providing, by the controller, a control signal to the electric drill in response to the vibration profile exceeding a predetermined threshold vibration profile, the control signal causing a reduction in a force applied by the electric drill relative to the work surface;
providing, by the controller, a control signal to a flow valve actuator of the lubrication system to cause a flow valve of the lubrication system to move to at least one of an opened position permitting a lubricant to flow from a reservoir of the lubrication system to the electric drill and a closed position inhibiting the flow of the lubricant; and
adjusting, by the MAS, the position of the electric drill relative to the work surface wherein the adjusting occurs at least in response to the vibration profile exceeding a predetermined threshold vibration profile.

19. The method of claim 18, wherein the first magnet provides a first magnetic coupling force and activation of the second magnet provides a second magnetic coupling force which supplements the first magnetic coupling force.

20. The method of claim 18, wherein the auto feed component includes a drill force sensor configured to provide a data signal to the controller indicating a drill force applied to the work surface by the electric drill and providing the control signal to the flow valve actuator to cause the flow valve to move to an opened position occurs at least in response to the electric drill exceeding a predetermined threshold drill force.

21. The method of claim 20, further including, providing, by the controller, one or more control signals to the auto feed component to cause movement of a drill bit holder in a predetermined drilling pattern.

22. The method of claim 18, further including magnetically coupling, by a first magnetic bracket, the reservoir of the lubrication system to a first metal surface and magnetically coupling, by a second magnetic bracket, an external power supply of the drill system to a second metal surface, the external power supply being configured to supply power to the electric drill.

23. The method of claim 22, wherein the lubrication system includes a flexible tube having a first end coupled to the reservoir and a second end coupled to the electric drill and when the flow valve moves to the opened position, the lubricant flows from the reservoir to the electric drill via the flexible tube.

24. A drill system comprising:
an electric drill;
a lubrication system including a reservoir containing lubricant, a flexible tube having a first end coupled to the reservoir and a second end coupled to the electric drill, the flexible tube providing a flow path for the lubricant;
a permanent magnet coupled to the electric drill, the permanent magnet configured to magnetically couple the electric drill to a vertical work surface;
a coupler plate configured to mechanically couple the magnet to the electric drill;
an electromagnet coupled with the electric drill
at least one sensor coupled with the electric drill;
a controller coupled to the electric drill and the electromagnet, wherein the controller is coupled with the at least one sensor to receive inputs from the at least one sensor and control the electric drill and the electromagnet based on predetermined control logic or instructions that control the electric drill while it is drilling into a metal surface and altering operation of the electric drill based on measurements by the at least one sensor, wherein the force measurements by the at least one sensor comprise one or more of vibration, force applied by the drill against the first metal surface, and orientation of the electric drill, wherein said controller engages in said altering operation when said sensor and controller determines said force applied by said electric drill is within a predetermined range of force associated with force required to detach said electric drill from said first metal surface and thereby cause movement of the electric drill by applying force in excess of magnetic coupling supplied by the first magnet and the electromagnet, wherein said controller further includes control sections that selectively operates the electromagnet to increase magnetic coupling with the first metal surface when said controller determines said force applied by said electric drill against the first metal surface is within said predetermined range of force to augment the first magnet to increase magnetic coupling with the first metal surface when said force applied by said electric drill is within said predetermined range of force; and a first magnetic bracket coupled to the reservoir and magnetically coupled to a first metal surface, wherein the first magnetic bracket and the flexible tube cooperate to allow the reservoir to be spaced apart from and positioned independent of the location of the electric drill.

25. The drill system of claim 24, the lubrication system further including a flow control valve and a valve position lever configured to move the flow control valve to at least one of an opened position and a closed position, wherein lubricant flows from the reservoir to the electric drill when the reservoir is in an elevated location relative to the electric drill and when the flow control valve is in an opened position.

26. The drill system of claim 24, further including a second magnetic bracket coupled to an external power supply wherein the second magnetic bracket permits the external power supply to be magnetically coupled to at least one of the vertical work surface, the horizontal work surface, the first metal surface and a second metal surface.

27. The drill system of claim 26, wherein the external power supply is configured to supply power to the electric drill.

28. The drill system of claim 24, further including a storage container configured to store the drill system wherein the storage container includes a first storage section configured to receive the electric drill and a second storage section configured to receive the lubrication system.

29. A method associated with a drill system comprising:
coupling a first magnet, an electromagnet, and a controller to an electric drill, wherein the controller receives inputs from the at least one sensor and controls the electric drill and the electromagnet based on predetermined control logic or machine readable instructions;
magnetically coupling, by the first magnet and selectively the electromagnet, the electric drill to a work surface;
coupling a first end of a flexible tube to a reservoir and coupling a second end of a flexible tube to the electric drill wherein the reservoir contains lubricant;
positioning, by a valve position lever, a flow control valve to at least one of an opened position and a closed position;
magnetically coupling, by a first magnetic bracket, the reservoir to a first metal surface wherein the first magnetic bracket and the flexible tube cooperate to allow the reservoir to be spaced apart from and positioned independent of the location of the electric drill;
supplying, by a lubrication system, lubricant from the reservoir to the electric drill wherein lubricant is supplied from the reservoir to the electric drill when the reservoir is in an elevated location relative to the electric drill and when the flow control valve is in an opened position;
operating the electric drill by drilling into the first metal surface and altering operation of the electric drill based on measurements by the at least one sensor, wherein the force measurements by the at least one sensor comprise one or more of vibration, force applied by the drill against the first metal surface, and orientation of the electric drill, wherein said controller engages in said altering operation when said sensor and controller determines said force applied by said electric drill is within a predetermined range of force associated with force required to detach said electric drill from said first metal surface and thereby cause movement of the electric drill by applying force in excess of magnetic coupling supplied by the first magnet and the electromagnet; and
selectively operating the electromagnet to increase magnetic coupling with the first metal surface when said controller determines said force applied by said electric drill against the first metal surface is within said predetermined range of force.

30. The method of claim 29, wherein the flexible tube provides a flow path for the lubricant wherein the lubricant flows to the electric drill from the first end to the second end.

31. The method of claim 29, wherein the work surface extends at least vertically and wherein the work surface extends at least horizontally.

32. The method of claim 29, wherein the lubrication system includes the reservoir, the lubricant, the flexible tube, the valve position lever, and the flow control valve.

33. The method of claim 29, further including storing, in a storage container, at least the lubrication system and the electric drill wherein the storage container includes at least a first storage section configured to receive the electric drill and at least a second storage section configured to receive the lubrication system.

34. The method of claim 31, further including magnetically coupling, by a second magnetic bracket, an external power supply to at least one of the vertical work surface, the horizontal work surface, the first metal surface and a second metal surface wherein the external power supply is configured to supply power to the electric drill.

* * * * *